No. 644,207. Patented Feb. 27, 1900.
H. KERRINNES.
APPARATUS FOR REMOVING WATER FROM PULPLIKE MATERIALS.
(Application filed Apr. 1, 1899.)
(No Model.) 2 Sheets—Sheet 1.

WITNESSES:
Fred White
René Bruine

INVENTOR:
Heinrich Kerrinnes,
By his Attorneys:

No. 644,207. Patented Feb. 27, 1900.
H. KERRINNES.
APPARATUS FOR REMOVING WATER FROM PULPLIKE MATERIALS.
(Application filed Apr. 1, 1899.)
(No Model.) 2 Sheets—Sheet 2.

WITNESSES: INVENTOR:
Heinrich Kerrinnes,
By his Attorneys:

UNITED STATES PATENT OFFICE.

HEINRICH KERRINNES, OF TILSIT, GERMANY.

APPARATUS FOR REMOVING WATER FROM PULP-LIKE MATERIALS.

SPECIFICATION forming part of Letters Patent No. 644,207, dated February 27, 1900.

Application filed April 1, 1899. Serial No. 711,362. (No model.)

*To all whom it may concern:*

Be it known that I, HEINRICH KERRINNES, a subject of the German Emperor, residing at Tilsit, in the German Empire, have invented certain new and useful Improvements in Apparatus for Removing Water from Pulp-Like Materials, more Particularly Peat Material; and I do hereby declare the following to be a full, clear, and exact description of the invention, such as will enable others skilled in the art to which it appertains to make and use the same.

The subject of this invention is an apparatus for removing water from or filtering pulp-like materials, more particularly comminuted-peat material containing water, in order to bring the same into a suitable condition for the manufacture of peat briquets.

The apparatus consists, essentially, in one or more tubes with perforated walls, which are coated on the inside with filtering material and into which the material from which water is to be removed is introduced under pressure. The tubes are provided in the interior with an arrangement through which the material from which the water has already been removed is removed from the filtering material toward the middle of the tubes in order to prevent the filtering medium from being clogged or rendered impermeable and the filtering or removal of the water rendered more difficult. At the same time by this arrangement the material is continuously mixed and a homogeneous consistency imparted to it.

Figure 1:
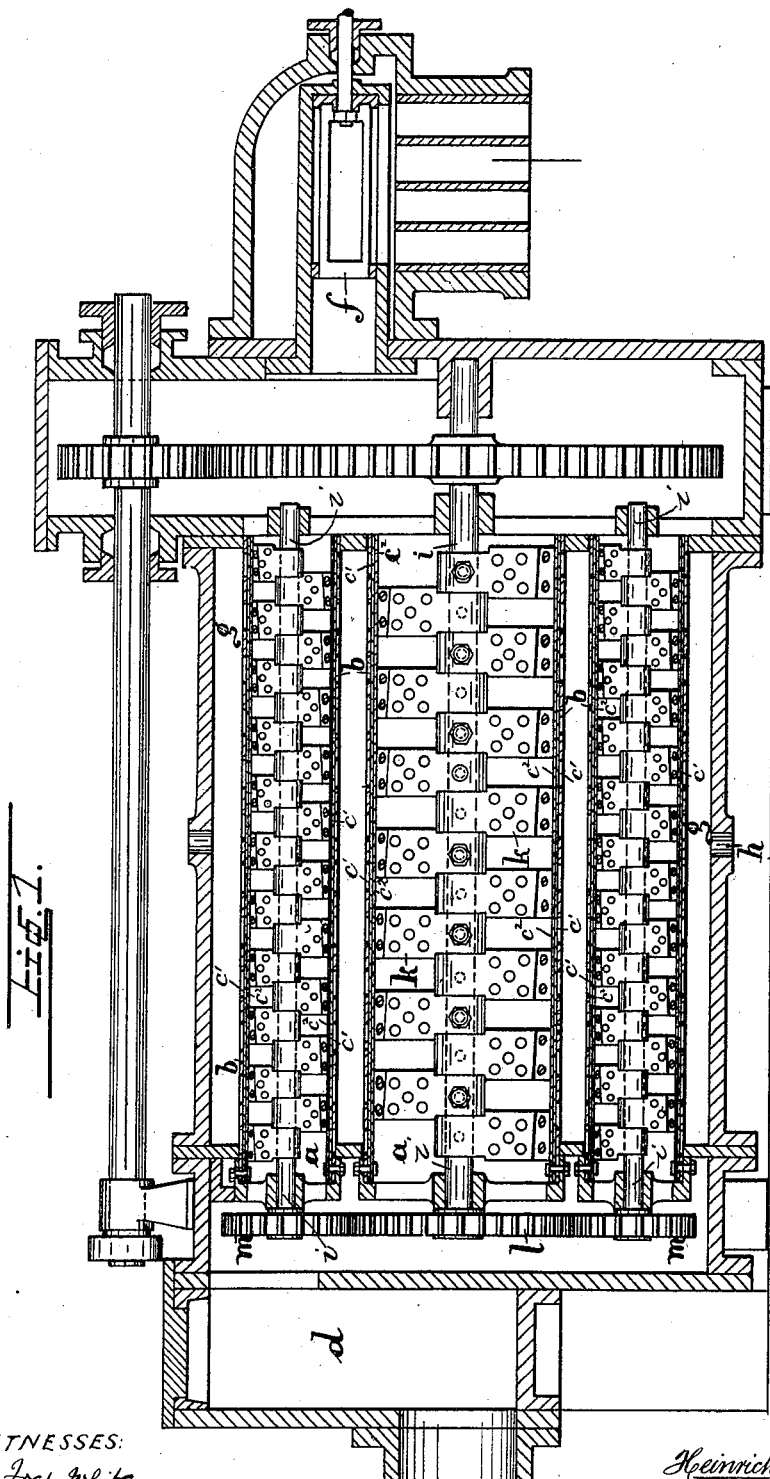
Figure 2:
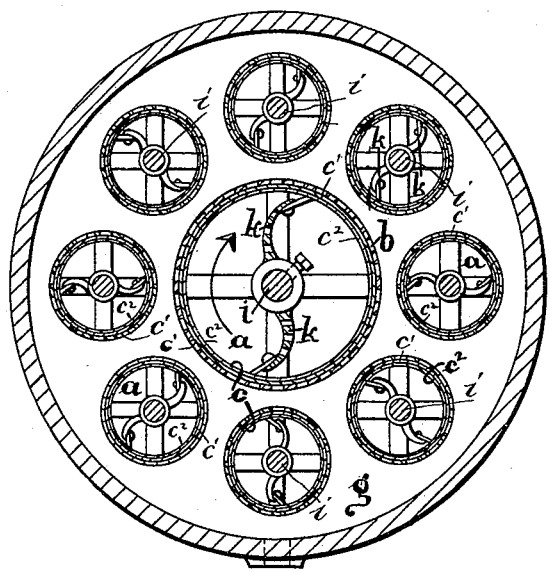

In the drawings the apparatus is shown in longitudinal section in Figure 1 and in transverse section in Fig. 2, an apparatus with nine water removing or filtering tubes being selected as an example. The number and arrangement of the tubes can, however, be varied as desired.

The apparatus consists of a number of tubes $a$, each formed by a perforated wall $b$, the internal surface of which is coated with a smooth pervious filtering medium $c$—for example, stout silk fabric $c'$ with a backing of felt $c^2$. The tubes $a$ are in communication with a chamber $d$, into which the material from which the water is to be removed—for example, comminuted-peat material containing water—is forced under pressure by a pump or other suitable means. This material enters under pressure into the water removing or filter tubes $a$ and is held therein for a time by a valve $f$, closing the outlet from the tubes, whereby the water contained in the material is pressed out of the material through the filtering medium and the perforated walls of the tubes and flows into a chamber $g$, surrounding the tubes, from which it can be conducted away through the apertures $h$.

With the strong pressure under which the material from which the water is to be removed must pass through the filter-tubes $a$ in order to get rid of the water, particles of the material from which the water has already been removed may lodge themselves on the filtering medium $c$, covering the inner wall of the tube, by reason of the great frictional resistance which this offers to the forward motion of the material, whereby the unimpeded removal of the water may be interfered with, since the water must first be forced through the particles of material from which the water has been removed. In order to obviate this disadvantage, cleaners are arranged on shafts $i$, passing through the several filter-tubes $a$, which cleaners cleanse the filtering medium. The cleaners have the form of curved worm-shaped blades or wings $k$, which are provided with holes in order to allow the material from which the water is to be removed to pass through easily on rotation of the shafts $i$.

In the rotation of the shafts $i$ the blades or wings $k$ cleanse not only the filter-walls of the tubes $a$, but by reason of their curvature move the particles of material from which the water has been removed inward toward the shaft. In this manner an uninterrupted removal of water and mixture of the material take place, whereby the material receives a very uniform consistency.

The driving of the shafts is effected by the toothed wheel $l$ on the center shaft, whereby the other shafts are driven by means of the toothed wheels $m$. The center shaft $i$ receives its motion from the exterior from a source of power by means of gear-wheels or belts.

What I claim as my invention, and desire to secure by Letters Patent, is—

1. In a filtering apparatus, the combination of a perforated filter-tube having a layer of filtering medium on its inner side, with a rotating shaft within said tube, and curved perforated scraping-blades mounted on said shaft and adapted upon its rotation to scrape the filtering medium and stir the material to be filtered, displacing inward the material from which the water has been removed.

2. A filtering apparatus comprising a plurality of perforated tubes $a$ lined with filtering medium, a casing inclosing said tubes, a chamber communicating with the interior of said tubes, rotary shafts within said tubes, scrapers mounted on said shafts, and means for simultaneously rotating said shafts.

In testimony whereof I affix my signature in presence of two witnesses.

HEINRICH KERRINNES.

Witnesses:
 T. SCHUMACHER,
 A. P. MILLER.